ELECTRONIC SWITCHING TELEPHONE SYSTEM

Original Filed March 23, 1960

2 Sheets-Sheet 1

INVENTOR.
VIRGLE E. PORTER
BY [signature]
ATTORNEY

ELECTRONIC SWITCHING TELEPHONE SYSTEM

Original Filed March 23, 1960

2 Sheets-Sheet 2

United States Patent Office 3,204,044
Patented Aug. 31, 1965

3,204,044

ELECTRONIC SWITCHING TELEPHONE SYSTEM

Virgle E. Porter, Country Club Hills, Ill., assignor to International Telephone and Telegraph Corporation, New York, N.Y., a corporation of Delaware Continuation of application Ser. No. 17,003, Mar. 23, 1960. This application Aug. 10, 1964, Ser. No. 389,826
45 Claims. (Cl. 179—18)

Figure 1A:
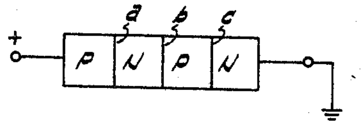
Figure 1B:
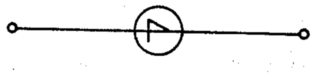

This invention relates to telephone systems and more particularly to electronic switching telephone systems including a plurality of cascaded matrices. This is a continuation of U.S. patent application Serial No. 17,003, filed March 23, 1960, now abandoned.

Reference is made to U.S. Patent 3,118,974, granted January 21, 1964 to A. J. Radcliffe, Jr. and T. A. Pickering, entitled "Electronic Switching Telephone System," and assigned to the assignee of the subject invention. Some of the features which are shown herein include circuitry of a type which is explained more fully in the above identified Radcliffe et al. application.

In the past, electro-mechanical switching equipment has been used to interconnect telephone lines. However, the weight and inertia of the moving parts of such equipment have presented barriers which inherently limit switching speed and further development of switching systems. in an effort to overcome these barriers, attempts have been made to provide switching devices utilizing only electronic circuit elements. However, when such attempts were made it was necessary to provide very complex and expensive circuitry to control the selecting of switching paths and supervising of electronic crosspoints. Therefore, electronic switching systems have tended to be unduly expensive and unable to compete on an economic basis with the older electro-mechanical equipment.

Accordingly, it is an object of this invention to provide new and improved electronically controlled switching matrices.

Another object of this invention is to provide electronic switching systems having a minimum amount of control equipment.

Yet another object of this invention is to provide a switching system wherein a self-seeking circuit interconnects two points via a path which includes randomly selected crosspoints in cascaded switching matrices.

In accordance with this invention, a plurality of electronically controlled crosspoints are arranged in horizontal and vertical multiples to provide switching matrices which may be cascaded to form a multi-stage switching network. When preselected multiples are marked simultaneously in first and last stages of such a switching network, electronic devices at associated idle crosspoints fire and there is a race from the marked multiple in the first stage over idle paths through the network toward the marked multiple in the last stage. When the race is over and the first path is completed through the matrices, current flows thereover to hold the completed path. All competing paths are self-releasing or self-blocking, depending upon such current flow. Thus, connections are completed over self-seeking paths via randomly selected crosspoints with virtually no supervision or control equipment required.

The term "race" is used to describe the condition (*a*) where a number of diodes try to fire simultaneously at a marked multiple, and (*b*) where paths race through matrices in relay, i.e. first one path tries to switch through, then a second path tries, then a third path tries, etc.

The term "random" is used to describe a process wherein crosspoints switch "on" and "off" at the mercy of chance. Thus, the paths which race through randomly selected crosspoints are guided only by the natural selection caused by minute variations of component and circuit characteristics, by the variations of any existing charges, stray currents or potentials, and by prior traffic conditions.

Figure 1C:
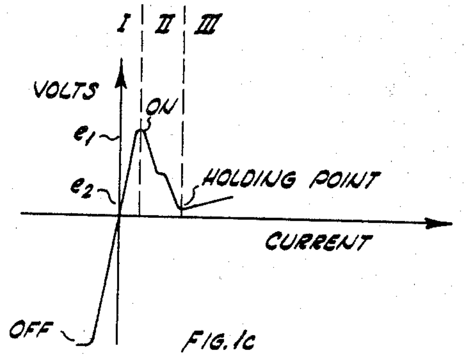
Figure 1D:
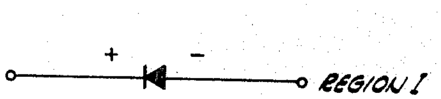
Figure 1E:
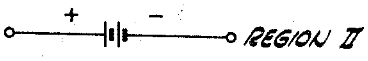
Figure 1F:
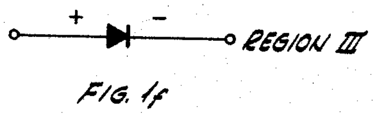
Figure 2:
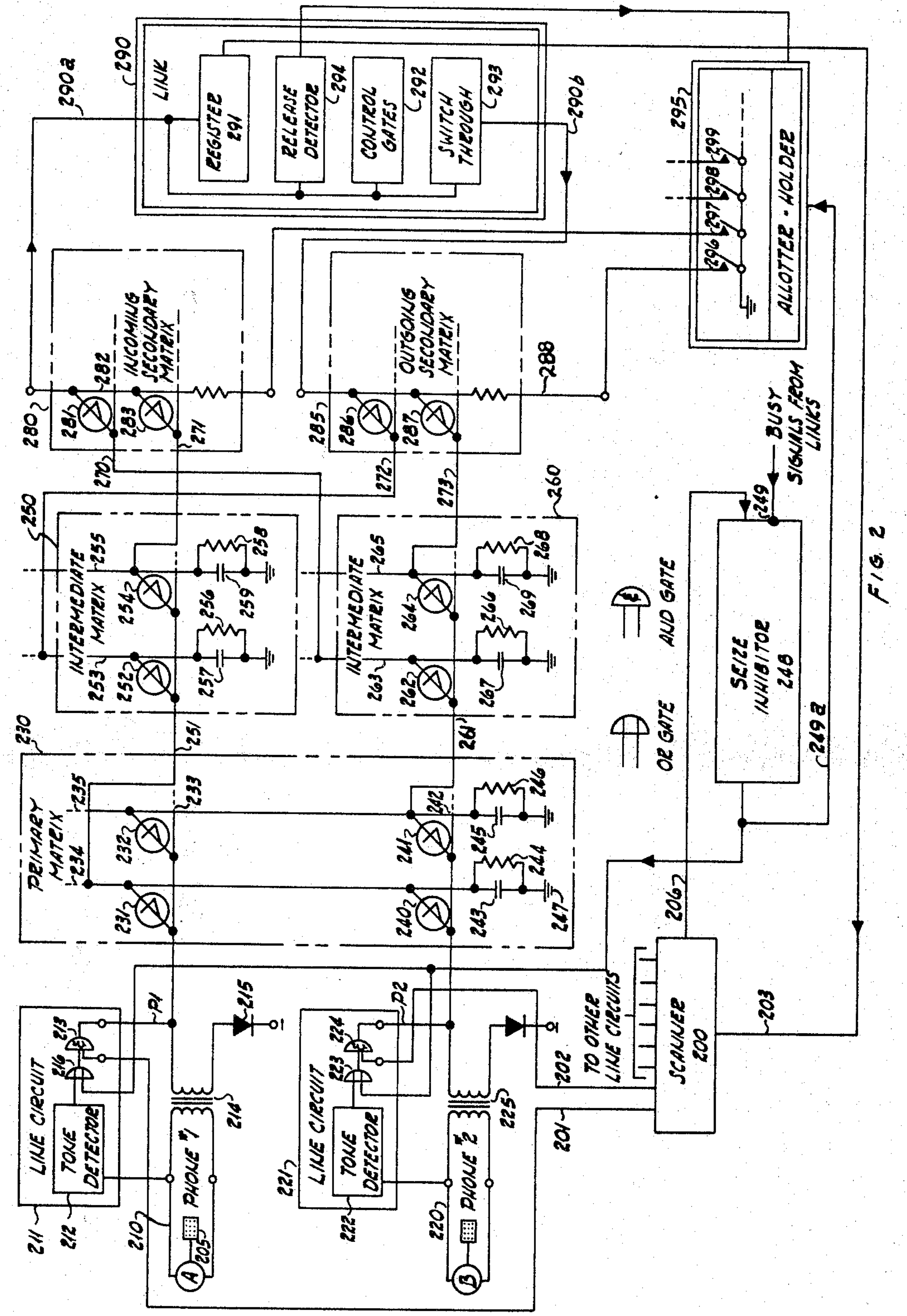

The above mentioned and other objects of this invention together with the manner of obtaining them will become more apparent and the invention itself will be best understood by making reference to the following description of an embodiment of the invention taken in conjunction with the accompanying drawings in which:

FIGURES 1*a*–1*f* are provided to help explain the characteristics of a switching device which is used at the crosspoints of the matrices; and FIGURE 2 schematically shows the circuit of a preferred embodiment of a telephone system that is made in accordance with the subject invention.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the invention is described in connection with a telephone system; however, it should be understood that the principles which are described hereinafter may find utility any time that automatic switching is required, as in connection with computer circuits. Moreover, any of many items which are known to those skilled in the art of automatic telephony may be used to complete the hollow boxes that are shown in the accompanying drawings. For example, allotters are devices which search for and preselect the idle equipment that will serve the next call, and registers are devices which store digital information. Also, the crosspoint is described as a PNPN diode because it has the desired characteristics; however, other crosspoints may be used if they too have the desired characteristics. Quite obviously, many other examples could be selected to illustrate the manner in which a wide range of equivalents should be given.

Next, reference is made to FIGURES 1*a*–1*f* which are helpful in explaining briefly the PNPN semiconductor switching element that is used at each crosspoint in the subject invention. For a more complete description of such a PNPN semi-conductor switch see U.S. Patent 2,855,524 granted to William Shockley on October 7, 1958 and assigned to Bell Telephone Laboratories, Inc.

As shown in FIG. 1*a*, a PNPN semiconductor switch or four layer diode is a semiconductor device that has alternative positive and negative sections with the two inside layers floating between the two outside layers which have terminals attached thereto. The symbol used elsewhere in the drawings to identify such a four layer diode is the numeral "4" enclosed within a circle (FIG. 1*b*) with the sloping side of the "4" pointing in the direction of current flow when the diode is turned "on."

The characteristics of a four layer diode are illustrated by the curve of FIG. 1*c*. When the diode is in an "off" condition, junction "*b*" (FIG. 1*a*) is reversely biased, the diode is electrically similar to the back biased diode of FIG. 1*d*, and very little current flows. As the biasing potential is increased, there is very little change in current flow as shown in Region I of FIGURE 1*c*. When the applied biasing potential reaches the voltage $e_1$, current begins to flow as shown in Region II of FIGURE 1*c* and the diode exhibits the negative impedance characteristic of a battery (FIG. 1*e*). The exact potential of the voltage $e_1$ will depend somewhat upon the waveform of the firing potential. Thus, if a slow rising voltage is applied, the diode fires at a much higher peak voltage than when a fast rising waveform is applied. The terms "rate sensitive" and "rate effect" are used to describe this change of firing voltage characteristic.

Thereafter, the diode has a very low resistance characteristic and the voltage drop across the two outside layers falls to the potential $e_2$ where the two intermediate layers of the diode are flooded with charge carriers and junction "*b*" (FIG. 1*a*) virtually disappears. As a result, there are two forwardly biased junctions "*a*" and "*c*" and no back biased junction "*b*"; whereupon, the four layer doide functions as a forwardly biased diode similar to that shown in FIG. 1*f*. As long as there is the minimum holding current that is indicated at the "holding point" (FIG. 1*c*), the four layer diode continues to exhibit an extremely low resistance; however, if the current falls below the "holding point," the diode reverts to its "off" condition, junctions "*b*" reappears, and the four layer diode is again back biased.

The characteristics of the crosspoint which I use are:

(1) When it is "off," it has a high impedance to give good isolation.
(2) When "on," it has a low impedance, linear transmission characteristic over the useful range (e.g. the voice frequency range when the network is used in a telephone system).
(3) It has a switching condition latching effect (i.e. when switched "off," it remains "off"; when switched "on," it remains "on").
(4) The crosspoint is self-extinguishing when it is not included in a completed path.
(5) The crosspoint may be switched "on" when either a high or a low voltage is applied across it depending upon the wave form of the marking voltage used to switch on the crosspoint.
(6) The crosspoint has a "memory effect" by means of which it may be either enabled to or inhibited from firing, depending upon whether it has access to a busy or an idle path.

A person designing a system using the invention will look for all of these characteristics when selecting a crosspoint. The parameters of any one characteristic depend upon the needs of the system being designed and on the other characteristics which are present in the crosspoint. For example, some breadth of the high-low switching range may be traded for a greater "memory effect" (or vice versa) in some applications. Likewise, the parameters of any of the characteristics may be selected relative to the parameters of other characteristic and the needs of any particular circuit design. This is important because it loosens the crosspoint tolerance requirements and reduces the network costs.

The first three characteristics (high or low impedance and latching) speak for themselves and need no clarification. The PNPN diode provides these for reasons which are obvious from a study of FIG. 1.

The fourth characteristic (self-extinction) occurs in the network when the PNPN diode starves for want of current after an associated capacitor charges.

The fifth characteristic, high-low voltage switching comes from the "rate sensitive" nature of the PNPN diode. Slow rising wave forms cause the diode to break down at a relatively high voltage. Fast rising wave forms cause it to fire at a relatively low voltage. This immediately suggests to the researcher that a network may be constructed from non-rate sensitive diodes having either high or low (but not both) voltage firing characteristics. The high voltage diodes are then used in the primary matrix, and the low voltage diodes are used in the following matrices.

The sixth characteristic ("memory effect") results from a reverse bias which is automatically imposed upon a nonfired diode when one side of it is connected to a busy path. As will become more apparent, I provide a number of common points (called "vertical busses") throughout my switching network. A number of diodes (hereinafter called "common connected diodes") are connected to each of these common points. After a diode is switched "on," a busy potential automatically appears at the common point and, therefore, on one side of all commonly connected crosspoints. The busy potential which is so applied removes the crosspoints' ability to switch "on" at the lower voltage. This is important since a "common connected" crosspoint is one which would cause a double connection if it were allowed to switch "on," and this cannot be allowed to happen. It does not happen because all idle and available crosspoints an any given matrix, which may switch "on" at the relatively low potential, and which are connected in common with a busy crosspoint, are inhibited by a combination of the vertical bus potential and the memory effect.

In greater detail, perhaps it may be well to review how the PNPN diode crosspoint achieves its memory effect. Once this is understood, it should be apparent that a similar "memory effect" may be given to many devices other than a PNPN diode.

A PNPN diode has three junctions—as shown in FIG. 1*a*. Each junction displays a well known capacitive effect. A capacitor might be defined as a device wherein the current through the capacitor is equal to the rate of change of voltage applied across the capacitor multiplied by its capacitance. Clearly then, for a given capacitor, the current flow will increase as a function of an increase in the rate of change of the applied voltage. In a PNPN diode, the junction capacitance passes current which is integrated over time to build up the number of charge carriers required to cause the diode to break down. Thus, when the applied voltage changes slowly the current is low and the charge density changes slowly. The diode will now fire only after the applied voltage becomes relatively high. Conversely, when the applied voltage changes quickly, the current is large, and the charge density changes quickly. The diode will now fire while the applied voltage is relatively low. This is the so-called "rate sensitivity" or "rate effect."

The semiconductor physics is quite complex because it involves such things as emitter action, transfer of carriers from one reverse biased junction to another reverse biased junction, and the necessity for an emitter junction to be forwardly biased for a period of time in the order of $10^{-7}$ seconds before carriers can be emitted and transported to another junction. Even though complex and difficult to explain briefly, these matters are well known. Since they are well known, it is sufficient to here consider only the single aspect of semi-conductor physics which contributes the most to the memory effect. Those skilled in the art will then readily perceive how to integrate this aspect into other aspects of semiconductor physics.

To understand this aspect, the reader should first realize that, in my network, diodes are connected across an array of horizontal and vertical busses. After a diode fires, the potential on the horizontal bus appears as a busy potential on the vertical bus. This vertical bus potential reverse biases all diodes connected to the vertical bus except for the fired diode. This diode bias, reverse biases the two outer junctions *a*, *c* (FIG. 1*a*) of the PNPN diode, and a charge is stored on the junction capacitances. If, subsequently, the diode is suddenly forwardly biased, charges are transferred from the outer junctions *a*, *c* to the inner junction *b*. However, emitter action does not commence because of this charge transfer. Instead, the PNPN diode must be forwardly biased to a voltage roughly equivalent to the previous reverse voltage before the reverse bias is completely removed from the outer junctions. Until this happens, the diode cannot fire. Thereafter still another time period must elapse for the emitter action to begin. The net effect is to raise the firing voltage above that which occurs in the network. This effect is independent of the rise time of the applied voltage, (i.e. the charged junction removes rate sensitivity).

In construction, each matrix (FIG. 2) has vertical and horizontal multiples including busses such as 233 and 234, for example, which are arranged to provide a plurality of intersecting crosspoints. At each crosspoint, there is a crosspoint switch having the desired characteristics (here shown as a PNPN semiconductor switch or four layer diode, such as 231). This crosspoint switch fires or breaks down when a potential difference of sufficient magnitude is applied across the horizontal and vertical busses associated therewith.

A plurality of cascaded matrices are arranged to provide a multi-stage switching network including a primary matrix 230, intermediate matrices 250 and 260, and secondary matrices 280 and 285. These secondary matrices are interconnected by a common one-way link 290. Therefore, the terms "incoming" and "outgoing" are used in the drawing to describe the manner in which calls are extended through link 290 and not necessarily to indicate how calls are extended through the cascaded matrices. Any suitable equipment (not shown) may be associated with the common links to provide the various services that may be required to complete telephone calls, such as conference call equipment, conversation timing equipment, etc.

In operation, when a call is placed, horizontal multiple 233 associated with calling line 210 is marked with a potential which is of sufficient magnitude to break down or fire at least one connected four layer diode, such as 231 or 232 if the vertical multiples 234 and 235 associated therewith are then idle, i.e. marked by ground potential via resistances 244 and 246. Each of the diodes 231 and 232 tries to fire. If both fire the resistance across the corresponding crosspoints virtually disappears and a potential from the marking source is passed on to each associated vertical multiple 234 and 235 and thence to horizontal multiples 251 and 261 in the next switching stage. It should be noted that these primary matrix diodes fire at a relatively high voltage because a bias applied through diode 215 forces them to do so. Moreover, the end-marking may be applied wtih a slow rising wave form to further insure the high voltage firing.

An important feature of the invention is that the crosspoints fire in a random manner. Therefore, in theory, it is possible that all diodes connected between an idle or grounded vertical multiple and marked multiple 233 will fire at the same instant when the potential on horizontal multiple 233 reaches a firing potential relative to the matrix ground. This, however, assumes that all of the diodes have similar characteristics. In practice, it is almost impossible for all diodes to have identical characteristics. Thus, it is almost certain that one, or perhaps a few, diodes will fire before the others depending upon many variables such as diode and circuit characteristics, existing charges, stray currents and potentials, prior traffic conditions, and the energy of the marking potential as compared with the firing characteristics of the diodes. In any event, after a diode or diodes fire, the ground on the vertical multiple lowers the marking potential on the intersecting horizontal multiple to keep the other diodes connected to the same horizontal multiple from firing. Also, after the potential from the marking source replaces ground on the vertical multiples, the potential difference between the marked vertical multiple and other intersecting horizontal multiples is such that the other crosspoint diodes connected to the marked vertical multiple at other horizontals are not likely to fire.

Beyond the unlikelihood of double firing caused by this potential difference, the memory effect inhibits all non-fired commonly connected diodes in the vertical multiple. This inhibition positively prevent double firing. Perhaps, a concrete—but entirely hypothetical—example will illustrate the point. First, assume that the diodes are constructed to break down when approximately 35-volts are applied across them with a slow rising wave form. The rate effect firing potential might then be in the order of 10 to 20-volts when the applied voltage rises sufficiently fast. Second, assume that vertical bus 253 stands at ground or 0-volts because it is idle and that vertical bus 255 stands at negative 24-volts because some other diode (not shown) connected thereto has fired. Next, assume that diode 231 fires. The voltage shoots up on bus 251 from 0-volts toward a negative 35-volts. There is a rapid voltage change as the marking potential is transferred from the line circuit 211 into capacitor 243. Since the junction capacitances of diode 252 are not charged, it fires at about 17-volts. However, the capacitances at the junctions of diode 254 are charged by the negative 24-volts on bus 255 which inhibits the diode, and it does not break down. Without the back bias the diode 254 might have fired when the absolute difference between the marking potential and the negative 24-volts exceeded 10-volts.

Means are provided for controlling the firing of diodes as the marking signal is passed, stage-by-stage, through the cascaded matrices. This means is provided by the resistor-capacitor network (such as 243, 244) coupled to each vertical bus. This network performs four primary functions. First, it speeds the rise of the potential on the vertical bus to fire the diodes in matrices other than the primary matrix, at the low rate sensitive voltage. Second it causes all fired crosspoints to extinguish themselves if a path is not completed. Third, it slows the return of an idle potential to the vertical bus to prevent the diodes from firing on the rate effect at that time. Fourth, the capacitors supply power for firing the diode in the next succeeding stage and store power over a period of time.

In greater detail, it should be apparent from the foregoing, that a marking potential is passed, stage-by-stage, through each of the cascaded matrices. As a diode fires in each stage, the voltage shoots up on the vertical bus because the diode fires into the vertical bus capacitance, such as 243. This means that the diodes in other than the primary matrix will fire at the low voltage because they fire on the rate effect. Since they are firing at the lower voltage the various voltage drops will be such that the current through the primary matrix diode does not fall below the holding point.

Because of the rate sensitive nature of the firings of the diodes in the matrices following the primary matrix, it is more likely that a plurality of diodes might switch "on" at about the same time. This, however, does not result in the offensive "fan-out current." Any diodes which fire but do not reach a terminating point, hold "on" only while the associated vertical bus capacitor (such as 243) charges. As soon as the capacitor is charged, the diode starves for want of current and switches "off." This switch "off" occurs extremely fast after the switch on so that the current does not exceed the diodes peak current carrying capacity.

Moreover, the network arrangement limits the number of diodes which can fire at any given time. In one exemplary system which was actually built, the effective network contained 3300 diodes, and 17 was the theoretically maximum number of diodes which could be switched "on" to draw current at any given time. In another exemplary system that was actually built, the network had 1100 diodes, and 8 was the theoretically maximum number of diodes which could fire and draw current at any given time. This small number of diodes does not amount to an excessive fan out with an offensive increase in current. Moreover, there is no assurance that all of the diodes will fire at any given instant to cause the theoretically maximum demand for current.

Care should be exercised in selecting the circuit values for the diodes relative to the circuit values for the resistor-capacitor networks on the vertical busses. To understand this aspect, again consider the hypothetical circuit values set forth above. Assume that the diodes 231 and 241 are "on" in separate paths and that negative 24-volts stand on busses 233 and 235. The junction capacitances of diode 232 are completely discharged. Now assume that diode 241 turns "off." The voltage on vertical bus 235 moves from the busy potential of a negative 24-volts toward the idle potential of ground. If this bus potential changes at a fast rate, the diode 232 might fire at the low, rate sensitive, voltage. Thus, the capacitor 245 should slow the rise time of the potential on bus 235 so that the diode 232 cannot fire at the low voltage.

The fourth capacitor function also helps reduce the current demands. That is, a primary matrix diode such as 231 fires and a charge is stored in the primary matrix capacitor such as 243. This stored charge furnishes much of the power required to fire the intermediate matrix diode. Current flows through the primary matrix diode to replenish the charge taken from the primary matrix capacitor and to help power the intermediate matrix diode firing. The same function is repeated at each switching stage. Thus, the network current demands are reduced because the replenishment of the store charge is distributed over time.

In resume, I have provided what I call a self-seeking, current controlled network. More particularly, it should now be apparent that a plurality of self-seeking connections are extended through the matrices in a random manner. These connections are extended in search of a multiple (such as 282) which is selectively marked (as at contacts 297) by an allotter-holder 295. During this search virtually all idle paths are explored. Because the crosspoints are switched "on" and "off" in a random manner, these idle paths may be extended sometimes simultaneously in parallel and sometimes sequentially in a relay race. This random extension of paths is not objectional, however, because the crosspoints are self-extinguishing and switch "off" before excessive current demands are encountered. Current flows through the first path which is completed from horizontal 233 to marked vertical multiple 282 and holds the diodes in that path in an "on" condition. After a diode fires and its associated capacitor charges, that diode must turn "off" unless it is part of the completed path. Moreover, after one path is completed, current ceases to flow through the diodes in all competing paths. When the current flowing through diodes in the competing paths falls below the "holding point," they are turned "off"—if they have not already turned "off."

Although the paths, per se, need not be preassigned and control circuits are not required, it is desirable for each path to see the same number of crosspoints so that the internal blocking factors are the same for all possible paths through the cascaded matrices.

Next to be described is the operation of a telephone system using the self-seeking, current controlled network. To initiate a telephone call, calling subscriber A removes a telephone or hand set from an associated hook switch (not shown), thereby transmitting any suitable signal over line 210. For example, a seizure tone consisting of two frequencies may be sent. In line circuit 211, the seizure tone is detected by any suitable means 212.

While any suitable means may be employed to determine when and how the seizure shall be effective, there are satisfactory results when each subcriber line is individually identified by a cyclically recurring time frame defined by signals applied by scanner 200 to line circuit conductors 201, 202, etc. and to link circuit conductor 203. Responsive to the simultaneous appearance in line circuit 211 of a seizure tone and the time frame signal extended over conducor 201, which identifies subscriber line A, a relatively high negative potential is applied through AND gate 213 to a sleeve or private conductor P1 and the horizontal bus or multiple 233 in primary matrix 230. While the wave shape of the pulse applied to conductor P1 may take many different forms, it is desirable that the pulse have a slow rising waveform which allows the diodes in the primary matrix 230 to fire at a relatively high potential. All diodes in other than the first matrix are fired by a fast rising waveform set by the charge time of various capacitors, such as 243, which allows them to fire at a relatively low potential. Among other things, these firing potentials allow the use of wide tolerances in diodes having different firing potentials and assure completion of the switching process before the diodes in the primary matrix starve currentwise. With this arrangement, it has been found that many switching stages may be cascaded to provide switching arrays for accommodating large commercial exchanges.

In matrix 230, busy vertical multiples are marked by a negative potential applied via a conductive PNPN diode. Therefore, with the memory effect, the difference between the sleeve or P1 conductor potential and the busy vertical bus potential is not sufficient to fire the PNPN diode at the associated crosspoint. On the other hand, if any vertical multiple is idle, ground potential is applied thereto, as from potential source 247, for example. Therefore, the potential difference between conductor P1 and at least one idle vertical bus exceeds potential $e_1$ (FIG. 1*c*) for a slow rising waveform and the associated crosspoint fires.

For purposes of this description, it is assumed that both vertical multiples 234 and 235 are idle when the relatively high negative potential is applied to conductor P1. Therefore, in one embodiment it may be assumed that both diodes 231 and 232 fire. The voltage drop across the terminals of each is reduced sharply, and the voltage applied to sleeve or private conductor P1 appears on vertical multiples 234 and 235 of primary matrix 230 and on horizontal multiples 251 and 261 of intermediate matrices 250 and 260 respectively. Vertical multiples 234 and 235 are now marked busy to all calls. After the diodes 231 and 232 fire, a charge begins to accumulate on capacitors 243 and 245, thereby causing a flow of current which holds the switched diodes in their "on" condition.

It could also be assumed that, in another embodiment, only one diode (231 for example) switches "on." Before any other diode can switch "on," the potential of the marking voltage on multiple 233 drops while capacitor 243 charges. As a charge accumulates on capacitor 243, horizontal multiple 251 goes negative. The circuit values are selected so that current flow through diode 231 to capacitor 243 accumulates a charge, and the intermediate matrix diodes fire. The current into capacitor 243 does not terminate before diodes in both the intermediate matrix 250 and the incoming secondary matrix 280 have an opportunity to fire.

Means are provided for limiting the simultaneous diode firings to the intermediate matrix and precluding simultaneous firing of diodes in the matrices at each end of the cascade. More particularly, in the described system, it is almost impossible for more than one primary matrix diode to fire at any given instant because of the described random differences between diodes. Only one switch is closed in the allotter hold circuit; hence only one secondary matrix diode can fire. Thus, four is the theoretically maximum number of diodes which can fire and simultaneously draw current. These are the one primary, two intermediate, and one secondary matrix diodes.

Each of the capacitors 257, 259, 267 and 269 associated with a fired diode begins to charge. This charging current provides the flow of current which holds the switched diodes in their "on" condition. It should be noted that the charges equalize on those of the capacitors 243, 245, 257, 259, 267, 269 which are associated with a fired diode. Therefore, the current flow required to apply the firing potential to the diodes in the intermediate matrices is primarily derived from the charged capacitors 243, 245. The only additional current flow through the diodes 231, 232 is the current necessary to bring the charge on the capacitors up to the source potential applied over conductor P1. In the exemplary system, it was found that this additional current never exceeded the current which flows through the diodes 231, 232 (or of any succeeding diodes) immedately after they turn "on."

At this point, all secondary matrix horizontal multiples 270–273, which are associated with a fired diode, are marked from the source which is applying the end-marking from AND gate 213 to sleeve or private conductor P1. Since the rise time of the charge on the capacitors may be about one hundred times as fast as the rise time of the pulses originally applied over conductor P1, the diodes in other than the primary matrix fire in rapid sequence and before the diodes 231, 232 switch "off" as a result of current starvation.

Upon reflection, it will be apparent that the capacitors 243, 245, 257, 259, 267 and 269 are timing means which cause the switching paths to race through each of the succeeding matrices in sequence. Stated another way, a diode in the primary matrix must fire before a charge can change on a capacitor to mark the intermediate matrix. There the process repeats before a marking is extended to the secondary matrix. Thus, the paths advance through the matrices in a one-way direction.

Prior to the initiation of the call being described, allotter-holder 295 closed one of the switches 296–299, in any conventional manner, to preassign a certain link, such as 290, to serve the next call. Thus, the preassigned link is the destination of a switching path. More particularly, it is now assumed that contacts 297 are closed and that contacts 296, 298 and 299 are open. The call may not be extended further over horizontal multiples 272 and 273 because no potential is applied to vertical multiple 288 of secondary matrix 285; hence, there is virtually no potential difference across the terminals of the PNPN diodes 286 and 287. On the other hand, since contacts 297 are closed, ground potential is extended to vertical multiple 282 and a firing potential is applied across both of the diodes 281 and 283.

Although the paths are racing through the matrices, it is virtually impossible for a time with two or more paths completed in parallel because diode and associated circuitry characteristics vary. In fact, with each succeeding one of the cascaded matrices the chances for almost identical characteristics diminish and, therefore, the chances for completing simultaneous paths also diminish. But this is not important because, if a path is not completed through the matrices, the fired diodes starve and switch "off." Other diodes switch "on" and take their places. This is because the original marking potential remains on conductor P1 long enough to insure the completion of a path through the matrices.

For the purposes of this explanation, assume that diode 283 is the first to complete the desired path through the network. There is virtually a short circuit between horizontal multiple 271 and vertical multiple 282. Therefore, the negative potential originally applied to sleeve or private conductor P1 appears on vertical multiple 282.

Means are provided for blocking and releasing all other paths which are competing in the race through the matrices after the first path has been completed. More particularly, after diode 283 fires and the potential on vertical multiple 282 approaches the potential appearing on horizontal multiple 271, the potential difference across the terminals of PNPN diode 281 drops and it cannot fire—assuming that it was trying to fire, which is unlikely. A current now flows through a path which may be traced from conductor P1 over horizontal multiple 233, PNPN diode 231, vertical multiple 234, horizontal multiple 251, diode 254, vertical multiple 255, horizontal multiple 271, diode 283, vertical multiple 282 and switch 297 in allotter-holder 295 to ground. After a period of time, all vertical bus capacitors associated with fired crosspoints are fully charged over the other paths that were competing in the race through the matrices. The current through the fire diodes is reduced below that point indicated in FIG. 1*c* by the words "holding point." Thus, they turn "off."

Means are provided for replacing the relatively high switching potential originally applied from line circuit 211 via conductor P1 with the relatively low bias potential and talking battery which is applied through diode 215. More particularly, when the time frame which identifies subscriber line 210 terminates, AND gate 213 ceases to conduct. The high negative end-marking potential is removed from the conductor P1. Thereafter, the randomly selected crosspoints in the path which won the race through the matrices is held over a circuit which may be traced from a relatively low negative potential extended through diode 215, the secondary winding of transformer 214, and multiples 233, 234, 251, 255, 271 and 282, to a ground potential (not shown) in link 290. This holding battery might also be used to supply telephone power in a common battery system.

The allotter-holder 295 steps-on and preselects a new link to serve the next call. Another connection may now be completed during a time frame which identifies the subscriber line on which the next call originates. Switch 297 may be held in a closed position by the holder circuit in 295 to hold the connection or the holding circuit may be switched to link 290.

Dial tone is returned from control gates 292 to subscriber station A. Any suitable equipment, such as a dial or push button selector 205 may now be operated to transmit digital information which is stored in register 291 to identify a called station. Scanner 200 scans the information stored in register 291. In any appropriate manner, the scanner applies a signal to conductor 206 during the time frame which identifies the called line, if it is then idle. If it is busy, the link associated therewith extends a marking over conductor 249 during the time frame which identifies the called line, thereby inhibiting gate 248.

It is assumed that the information stored in register 291 is the directory number of called station B. Therefore, a marking potential is applied over conductors 202 and 206 during the time frame which identifies called line B. Assuming that line B is idle, seize inhibitor gate 248 transmits the signal appearing on conductor 206 through OR gate 223 to the upper terminal of AND gate 224. There is a coincidence of two signals at the input terminals of AND gate 224 which conducts to extend a relatively high negative potential over conductor P2 to multiple 242. Also responsive to the signal conducted by seize inhibitor gate 248, a signal is transmitted over conductor 249*a* to cause allotter-holder 295 to close contacts 296 while opening the contacts associated with any other link. One example of how conductor P2 may be pulsed at the proper time, and how link 290 and other of the equipment functions is given in the above identified Radcliffe et al. patent.

When the high negative end-marking potential is applied through AND gate 224 to conductor P2, there is a race from horizontal multiple 242 of primary matrix 230 through the cascaded matrices of FIG. 2 to the marked vertical multiple 288 of secondary matrix 285. After termination of the time frame which identifies subscriber line 220, the common link 290 supplies the potential for holding all connections, transmits ringing current to subscriber station B and ringback tone to subscriber station A, and switches through at circuit 293 responsive to the receipt of answer supervision. Conversation follows.

While any suitable means may be used to release the connection, the above identified Radcliffe et al. patent shows means for controlling the release detector circuit 294 in the common link responsive to the receipt of a release tone that is transmitted by hook switch contacts when the conversing subscribers hang-up.

I have invented and described above a self-seeking, current controlled network having the ability to complete a path from any inlet to any outlet free of control from outside the network. To do this, I made use of the characteristics of a PNPN or four layer diode. It should be apparent, however, that later generation developments will provide other crosspoints having substantially these same characteristics. Moreover, some existing crosspoints could be modified by adding components which form a network that gives the desired characteristics. Thus, it follows that my claims should cover any self-seeking, current controlled network without regard as to whether it uses PNPN diodes or an equivalent device.

While the principles of the invention have been described in connection with specific apparatus, it is to be clearly understood that this description is made only by way of example and not as a limitation on the scope of the invention.

I claim:

1. A telephone system comprising a plurality of cascaded matrices, each of said matrices including first and second multiples arranged to provide intersecting crosspoints, means for identifying each first multiple in a first matrix of said cascaded matrices by an individually associated time frame, means responsive to simultaneous marking of multiples in first and last of said cascaded matrices during the time frame which identifies said marked multiple in said first matrix for initiating a race over randomly selected idle crosspoints to establish a connection between said marked multiples, and means responsive to the completion of said connection for releasing all of said randomly selected crosspoints which are not included in said connection.

2. An electronic switching telephone system comprising a plurality of cascaded matrices, each of said matrices including horizontal and vertical multiples arranged to provide intersecting crosspoints, a PNPN semiconductor switching device connected between intersecting horizontal and vertical multiples at each of said crosspoints, means responsive to the application of a high potential of one polarity to one of said multiples for firing at least one of the PNPN devices connected thereto, thus passing said high potential through all conductive PNPN devices to intersecting multiples, means responsive to a marking of opposite polarity applied to another of said multiples for causing current flow through certain of said PNPN devices, and means responsive to said current flow for blocking the extension of connections through all other of said PNPN devices.

3. An electronic switching telephone system comprising cascaded matrices, each of said matrices including first and second multiples arranged to provide intersecting crosspoints, a PNPN semiconductor switching device connected between intersecting multiples at each of said crosspoints, a telephone line individually associated with each of said first multiples in a first of said matrices, allotter means for applying a first marking to one of said multiples in a last of said matrices, means responsive to the extension of a call over one of said telephone lines for applying a second marking to the multiple that is individually associated therewith, said second marking comprising a high potential relative to said first marking, thereby firing at least one of the PNPN devices connected to said last named multiple, means for passing said high potential through the fired PNPN devices to intersecting multiples associated therewith, means responsive to said passed potential for causing a race through idle crosspoints in succeeding matrices to said marked multiple in the last of said matrices, and means responsive to the completion of a path to said marked multiple in said last matrix for releasing all crosspoints which are not included in said path.

4. A telephone system comprising a plurality of telephone lines, a plurality of interconnected crosspoint matrices, each of said matrices including first and second busses arranged to provide intersecting busses at each of said crosspoints, means for connecting each of said lines to individually associated ones of said first busses in one of said matrices, a plurality of links, means for connecting each of said links to individually associated ones of said first busses in another of said matrices, means for pre-selecting one of said links to serve the next call to be extended through said system by marking the bus individually associated therewith by a first potential, means responsive to the initiation of said next call for marking the bus individually associated with the calling line by a second potential, the difference between said first and second potentials being sufficient to complete a self-seeking connection through randomly selected crosspoints in said matrices from a calling one of said lines to said selected link, means in said preselected link responsive to the receipt of signals identifying the directory number of a called one of said lines for extending a signal to the one of said busses which is individually associated with said called line, and means responsive to said last named means for extending a self-seeking connection between said pre-selected link and said called line through randomly selected crosspoints in said matrices.

5. A telephone system comprising a plurality of subscriber lines, a plurality of interconnected electronic crosspoint matrices, means for connecting each of said subscriber lines to individually associated points in a first of said matrices, a plurality of control links, means for connecting each of said links to individually associated points in another of said matrices, means for preselecting one of said links to serve the next call to be extended through said system, means responsive to the initiation of said next call for extending a self-seeking connection from a calling one of said lines through randomly selected crosspoints in said matrices to said preselected link, a register associated with said preselected link, means responsive to the registration of directory number identifying signals received over said calling line for extending a signal to a called one of said lines, and means responsive to said last named means for extending a self-seeking connection between said link and said called line through randomly selected crosspoints in said matrices.

6. A switching matrix comprising a plurality of bistable semiconductor switching devices each having two terminals, each of said switching devices being switched from a first stable state to a second stable state responsive to an application of a relatively high potential across said terminals and for thereafter being held in said second stable state responsive to an application of a relatively low potential across said terminals, means for interconnecting said switching devices to provide a matrix in which said devices are connected in parallel rows, means for applying said relatively high potential across the terminals of all said switching devices in a first of said rows, thereby switching at least one of said devices in said first row to said second stable state, and means responsive to the completion of a connection through said matrix for switching all except one of said switched devices in said first row back to said first stable state.

7. A switching matrix comprising a plurality of bistable four layer semiconductor switching devices, said layers having alternate polarity whereby said switching device is switched from a first stable state to a second stable state responsive to an application of a high potential across the outside layers thereof, means for interconnecting said switching devices to provide a matrix having a configuration which is such that a plurality of said switching devices are switched from said first to said second stable states responsive to an application of said high potential across said interconnected configuration, and means responsive to current flow through one of said switched devices for switching all except said one of said switched devices from said second back to said first stable states.

8. A switching matrix comprising a plurality of horizontal and vertical busses arranged to provide intersecting crosspoints, a plurality of bistable switching devices, means for connecting each of said switching devices between a horizontal and a vertical bus at an individually associated crosspoint, means responsive to an application of a control potential to a particular bus for switching said devices connected thereto from a first stable state to a second stable state whereby said control potential is applied to each of the busses which intersects said particular bus at a switched crosspoint, means responsive to said application of said control potential to said last named busses for measuring a predetermined period of time, and means responsive to said last named means for switching all of said devices connected to said particular bus from said second state to said first state if no current is flowing therethrough at the end of said time period.

9. A switching matrix comprising a plurality of horizontal and vertical busses arranged to provide intersecting crosspoints, a plurality of bistable switching devices, means for effectively connecting each of said switching devices between a horizontal and a vertical bus at an individually associated crosspoint, means including a capacitor associated with each individual vertical bus for selectively applying idle marking potentials to said vertical bus when said vertical bus is idle, means responsive to an application of a control potential to a particular horizontal bus for switching at least one of said devices connected thereto from a first stable state to a second stable if the associated vertical bus is then marked by idle potential, means responsive to said switching of said device to said second stable state for charging said capacitor associated with the vertical bus connected to said switched device, means responsive to potentials built upon said charged capacitor for applying a control potential to busses in a succeeding matrix to switch at least one device in such matrix connected to at least one of said busses from a first stable state to a second stable state, and means responsive to fully charging said capacitor for switching said device in said succeeding matrix back to said first stable state if a connection has not been completed therethrough.

10. An electronic switching system comprising a plurality of cascaded matrices, each of said matrices including first and second groups of busses which intersect with each other at crosspoints, electronic switch means at each of said crosspoints, said switch means being fired when the potential difference between intersecting busses reaches a firing potential, means for applying a relatively slow rising potential to a selected one of said first busses in a first of said cascaded matrices whereby at least one electronic switch means fires when said slow rising potential reaches firing potential, means associated with each of said second busses for accumulating a charge responsive to current flow through said electronic switch means after it fires, and means responsive to said accumulated charge reaching said firing potential for firing other randomly selected ones of said switch means in succeeding ones of said cascaded matrices, said accumulated charge having a relatively fast rise time, whereby said randomly selected switch means in succeeding ones of said cascaded matrices fire before the first fired of said switch means starves currentwise.

11. The electronic switching system of claim 10 and means responsive to current flow over a first completed path through said matrices for starving currentwise all of said randomly selected switch means not included in said first completed path.

12. A plurality of cascaded matrices, each matrix including intersecting multiples which provide switching crosspoints, electronic switch means at each of said crosspoints, capacitor means connected to certain of said multiples and potential marking means selectively connected to other of said multiples, means responsive to the firing of a switch means for passing said potential from said marking means to charge said capacitor means, and means responsive to the charge on said capacitor means for applying a marking to a multiple in the next succeeding one of said cascaded matrices.

13. A switching network comprising a plurality of inlets and outlets and paths therebetween, said paths therebetween comprising a plurality of PNPN diode crosspoints which are independently self-selecting, and means free of any external control circuits between said inlets and outlets and including said self-selecting crosspoints for randomly completely one of said plurality of paths between one of said plurality of inlets and one of said plurality of outlets, each of said PNPN diode crosspoints being a bistable circuit arrangement which is included in at least one of said paths.

14. A switching system comprising a plurality of inlets and a plurality of outlets, means including a network of cascaded stages of parallel connected electronic switching devices for extending switch paths from any of said inlets to any of said outlets, said electronic switching devices having similar but not identical switching characteristics whereby an application of a switching signal at one of said inlets cause at least one of said switching devices having fast switching characteristics to switch "on" before at least another of said switching devices having slow switching characteristics, means comprising a charge accumulating device associated with said one switching device for holding said one switching device "on" for a predetermined period of time while said charge accumulates, and means effective after a substantial completion of the accumulation of a charge for switching "off" said one switching device if a switching path is not then completed though said network, thereby allowing said other switching device to switch "on."

15. A network including similar, but not identical, parallel connected bistable, two terminal semiconductor switching devices, the characteristics of said devices being such that said devices switch to one stable state responsive to an application of a relatively high voltage across said two terminals, are held in said one stable state responsive to a greater than a predetermined rate of current flow through said device after said device is switched to said one stable state, and are switched to the other of said bistable states when said current flow falls below said predetermined rate, whereby at least one of said parallel devices having a lower switching voltage characteristic switches to said one stable state before at least another of said parallel devices having a higher switching voltage characteristic; means responsive to said one device switching to said one state for drawing current through said one device for a predetermined period of time adequate to complete a switch path through said network; means effective after said period of time for drawing current through said path if completed through said network, thereby holding said one device in said one state, said one device switching to said other stable state at the end of said period of time if said current does not flow over said completed path; and means effective after said one device switches to said other stable state for switching said other device to said one stable state.

16. An electronic switching telephone system comprising means for completing a telephonic connection over a self-seeking path through randomly selected points in a multistage switching network responsive to an application of a potential difference across the ends of said path, means responsive to current starvation in at least some of said selected points for releasing at least some of said points while said paths are being extended, and means responsive to current flow over a first completed one of said paths for holding said completed connection.

17. An automatic switching system comprising a plurality of cascaded matrices, each of said matrices including first and second multiples arranged to provide intersecting crosspoints, a resistor-capacitor network connected to each of said second multiples, means responsive to simultaneous marking of a multiple in one of said matrices and a multiple in another of said matrices for initiating a switching race over a plurality of self-seeking paths extended via randomly selected crosspoints in said cascaded matrices, said self-seeking paths being extended and collapsed responsive to the charging of said capacitors, and means responsive to the completion of a first of said paths between said marked multiples for blocking the further extension of connections over all other of said paths.

18. A switching system having a plurality of switching points for selectively interconnecting lines, means for selectively applying switch controlling signals to a first one of said lines, means responsive to signals transmitted over said first line for selectively marking another of said lines, means comprising capacitors coupled to said switching points for controlling the current therethrough, and means responsive to the application of said switch controlling signals and said marking to said switching system for completing a connection between said first and other lines via randomly selected switching points, said random selection resulting in part from the current controlled by said capacitors.

19. A plurality of cascaded matrices, each of said matrices including a plurality of rate sensitive electronic crosspoints, said crosspoints being switched "on" responsive to an application of a firing potential and switched "off" responsive to a reduction of current flowing through them, means responsive to end marking firing potentials applied to said cascaded matrices for extending switching paths through said matrices, at least some of said crosspoints firing at a rate sensitive potential, and means at each of said matrices for timing the flow of current through fired crosspoints, thus causing crosspoints to switch "on" and "off," to extend switching paths through each succeeding matrix in a timed sequence.

20. A telephone switching system comprising a plurality of rate sensitive switching points, a plurality of subscriber lines having access to said switching system, means responsive to signals transmitted from a first one of said lines for marking a second one of said lines, and means responsive to said marking of said second line for completing a connection between said first and said second subscriber lines via randomly selected switching points, said random selection resulting in part from the rate sensitivity characteristics of at least some of said switching points in said connection.

21. A telephone comprising a plurality of normally "off" rate sensitive switching points for establishing a speech path between telephone lines, means for applying a biasing potential to a point between each of said lines and an associated one of said switching points, and means responsive to an application of a relatively high potential across the ends of a desired speech path for switching "on" a plurality of said switching points to complete said desired speech path, all of said plurality of switching points except those having said bias potential applied thereto switching "on" at said rate sensitive voltage.

22. The telephone system of claim 21 and means for thereafter removing said high potential thus leaving said biasing potential applied to said desired switch path for holding said desired path and supplying talking battery.

23. The telephone system of claim 21 wherein each of said switching points is conected in parallel with at least one other of said switching points, and means responsive to any of said switching points switching "on" for inhibiting all of the switching points connected in parallel therewith.

24. An automatic switching system comprising a plurality of cascaded switching networks comprised of rate sensitive electronic switch means, means responsive to simultaneous markings applied at opposite ends of said cascaded network for extending self-seeking paths through said network, and means whereby the electronic switch means in the first of said cascaded networks fire at a relatively breakdown potential and the electronic switch means in succeeding ones of said cascaded networks fire at a relatively low rate sensitive potential.

25. A telephone system comprising a plurality of cascaded electronic crosspoint switching networks, a plurality of subscriber lines each being connected to an individually associated point of access on one end of said cascaded networks, means responsive to a call from a calling line or a call to a called line for extending a seizure signal to the point of access individually associated with the calling or called line, and means responsive to said seizure signal for extending a connection from said one end in a oneway direction to the opposite end of said cascaded networks, whereby both calling and called lines are extended through the same switching network in the same one-way direction.

26. A unitary swtiching system for interconnecting lines connected to one end thereof via links connected to the other end thereof, said switching system comprising a plurality of cascaded matrices, each of said matrices including a plurality of electronic crosspoints, means responsive to a first electrical marking applied to one end of said cascaded matrices for identifying the destination of a switching path through the matrices, means responsive to a second electrical marking applied to the other end of said cascaded matrices for extending a switch path in a oneway direction from said second marking on said other end to said first marking at said destination, means responsive to a third electrical marking applied to said one end also for identifying said destination of said switching path through said matrices, means responsive to a fourth electrical marking applied to the other end of said cascaded matrices for extending another switch path in said one-way direction from said fourth marking to said third marking, and means at said destination for coupling the switch paths extended thereto.

27. An electronic switching system comprising a single unitary switching network having a plurality of cascaded switching stages, one side of said network comprising a line side and the other side of said network comprising a link side, a plurality of lines, means for coupling each of said lines to a single point of access per line on the line side of said network, means responsive to a calling condition on one of said lines for extending a switch path from the single point of access associated with the calling line in a one-way direction through said network to the link side of said network, means responsive to a called condition extended to another of said lines for extending another switch path from the single point of access associated with the called line in said one-way direction through said network to the link side of said network, and means on said link side for interconnecting said switch paths.

28. A telephone system comprising a plurality of cascaded matrices coupled to form a self-seeking, current controlled network, each of said matrices including first and second multiples arranged to provide intersecting crosspoints, crosspoint switch means interconnecting a first multiple and a second mutiple at each intersection in said matrix, means responsive to a simultaneous marking of intersecting multiples for causing the crosspoint switch means at the intersection to establish an electrical connection between said marked multiples, and means responsive to said connection for inhibiting all other of the crosspoint switch means which are connected to one of said marked multiples.

29. An electronic switching telephone system comprising a self-seeking, current controlled network comprised of a plurality of cascaded matrices, each of said matrices including horizontal and vertical multiples arranged to provide intersecting crosspoints, a semiconductor switching device connected between intersecting horizontal and vertical multiples at each of said crosspoints, and means for applying high potential end-marking of one polarity to one of said multiples for firing at least one of the devices connected thereto thus passing said high potential through the conductive devices to the intersecting multiple, said high potential appearing on said intersecting multiple serving to back bias all of said devices that are connected to said intersecting multiple which are not then fired.

30. An electronic switching matrix comprising a plurality of bistable semiconductor switching devices each having two terminals, each of said switching devices being switched from a first stable state to a second stable state responsive to an application of a relatively high potential across said terminals, said device being thereafter held in said second stable state responsive to current flow through said device, means for interconnecting said switching devices to provide a matrix in which said devices are connected in rows and columns extending in two intersecting directions, means for applying said relatively high potential across the terminals of all said switching devices in a row extending in a first of said directions, means responsive to the switching of a device for inhibiting all devices in the intersecting column, and means responsive to an automatic termination of current flowing through said devices when in second stable state for switching all of said switched devices back to said first stable state if they are not part of a completed path.

31. The matrix of claim 30 and means for limiting the number of diodes which can simultaneously switch to said second state.

32. A telephone system comprising a plurality of subscriber lines, a plurality of interconnected electronic crosspoint matrices, each of said crosspoints having characteristics such that it may fire on either a high or a low voltage depending upon the previous voltage conditions experienced by said crosspoint, means for connecting each of said subscriber lines to individually associated points in a first of said matrices, a plurality of control links, means for connecting each of said links to individually associated points in another of said matrices, means for selecting one of said links to serve the next call to be extended through said system, means responsive to the initiation of said next call for extending a self-seeking, current-controlled connection from a calling one of said lines through randomly selected crosspoints in said matrices to said selected link, at least one part of said path being extended by firing crosspoints at said high voltage and another part of said path being extended by firing crosspoints at said low voltage, and means responsive to each crosspoint firing for inhibiting all commonly connected crosspoints from firing at said low voltage.

33. The system of claim 32 and a register associated with said selected link, and means responsive to the registration of directory number identifying signals received over said calling line for extending a self-seeking, current controlled connection between said link and said called line through randomly selected crosspoints in said matrices.

34. A switching matrix comprising a plurality of bistable multi-layer semiconductor switching devices, a junction capacitance being formed at each layer, means for interconnecting said switching devices to provide a matrix having a configuration which is such that a plurality of said switching devices are switched from said first to said second stable states responsive to an application of said high potential across said interconnected configuration, means for automatically returning said devices to said first state if they are not part of a completed path, and means responsive to current flow through any of said switched devices for charging the junction capacitances and thereby inhibiting all crosspoints which are commonly connected with the device through which the current is flowing.

35. A switching matrix comprising a plurality of horizontal and vertical busses arranged to provide intersecting crosspoints, a plurality of bistable switching devices, means for effectively connecting each of said switching devices between a horizontal and a vertical bus at an individually associated crosspoint, means responsive to an application of a control potential to a particular horizontal bus for switching at least one of said devices connected thereto from a first stable state to a second stable state if the associated vertical bus is then marked by an idle potential, a capacitor associated with each individual vertical bus for applying potentials to said vertical bus, means responsive to said switching of said device to said second stable state for charging the capacitor associated with the vertical bus connected to said switched device, means responsive to potentials built upon said charged capacitor for applying a busy potential to the associated vertical bus, and means responsive to said busy potential for inhibiting all of the other devices connected to said vertical bus.

36. The matrix of claim 35 and means responsive to the charging of said capacitor for switching said device back to said first stable state if a connection has not been completed therethrough.

37. An electronic switching system comprising a plurality of cascaded matrices, each of said matrices including first and second groups of busses which intersect with each other at crosspoints, electronic switch means at each of said crosspoints, said switch means having characteristics by which it is fired when the potential difference between intersecting busses reaches either of two voltages depending upon the characteristics of the voltages applied across said busses, means for applying a voltage with a first characteristic to a selected one of said first group of busses in a first of said cascaded matrices for firing at least one electronic switch means at a relatively high firing potential, means associated with each of said second group of busses for accumulating a charge responsive to current flow through said electronic switch means after it fires, means responsive to said charge for inhibiting all crosspoints which are commonly connected with said fired crosspoint, and means responsive to said accumulated charge reaching a firing potential for firing other randomly selected ones of said switch means in succeeding ones of said cascaded matrices, said accumulated charge having characteristics whereby said randomly selected switch means in the succeeding ones of said cascaded matrices fire at a relatively low voltage before the first fired one of said switch means starves currentwise.

38. A telephone system comprising a plurality of cascaded matrices coupled to form a self-seeking, current controlled network, each of said matrices including first and second multiples arranged to provide intersecting crosspoints with crosspoint switch means interconnecting a first multiple and a second multiple at each intersection in said matrix, the characteristics of the crosspoint being:

(1) When it is "off" it has a high impedance to give good isolation,
(2) When on, it has a low impedance, linear transmission characteristic over the useful range,
(3) It has a switching condition latching effect,
(4) The crosspoint is self-extinguishing when it is not included in a completed path,
(5) The crosspoint may be switched "on" responsive to either a high or a low voltage applied across it, and
(6) The crosspoint has a "memory effect" by means of which it may be either enabled to or inhibited from firing, depending upon whether it has access to a busy or an idle path.

39. A switching network comprising a plurality of cascaded matrices, each of said matrices including a plurality of crosspoint switch means for interconnecting a matrix inlet with any of a plurality of matrix outlets, means responsive to an application of simultaneous end-markings at each end of said cascade for establishing a connection from a first of said end-markings through said network to the other of said end-markings, and means for limiting the number of crosspoint switch means which are able to fire simultaneously in the matrices at the beginning and end of said cascade to which said end-markings are applied.

40. A plurality of cascaded matrices, each matrix comprising a plurality of bistable semiconductor switching devices each having two terminals, each of said switching devices being switched from an "off" stable state to an "on" stable state responsive to an application of a potential across said terminals, means for interconnecting said switching devices to provide a matrix in which said devices are connected in parallel rows extending in two intersecting directions, whereby said network is subject to fan-out conditions, and means for precluding excessive fan-out by limiting the number of said devices which may fire simultaneously in the matrices adjacent each end of said cascade and thereby limiting the conditions where simultaneous firings may occur to the middle of said cascade.

41. The cascaded matrices of claim 40 and means responsive to the firing of a device in any of said matrices for switching "off" said switched device if current does not flow over a path including said switched device.

42. A telephone system comprising a plurality of subscriber lines, a plurality of interconnected electronic crosspont matrices, each of said crosspoints having characteristics such that it may fire on either a high or a low voltage depending upon the previous voltage conditions experienced by said crosspoint, means for connecting each of said subscriber lines to individually associated points in a first of said matrices, a plurality of control links, means for connecting each of said links to individually associated points in another of said matrices, means for selecting one of said links to serve the next call to be extended through said system, means for firing crosspoints at said high voltage in said first matrix to extend a self-seeking connection from a calling one of said lines through randomly selected crosspoints in said matrices to said selected link, at least part of said path being extended by firing crosspoints at said low voltage, at least the crosspoints being fired at said high voltage being limited by their inherent characteristics to one-at-a-time firing, and means for quickly switching "off" any one of said crosspoints which is not part of a completed path.

43. The system of claim 42 and means responsive to each firing for inhibiting all parallel connected crosspoints from firing at said low voltage.

44. The telephone system of claim 42 and a register associated with said selected link, and means responsive to the registration of directory number identifying signals received over said calling line for extending a self-seeking connection between said link and said called line through randomly selected crosspoints in said matrices.

45. A switching network comprising a plurality of inlets and outlets and a plurality of paths therebetween, said paths therebetween comprising a plurality of PNPN diode crosspoints having similar firing potential characteristics which vary within production tolerance limits, and means including said crosspoints for selecting one among said plurality of paths responsive to said differences between said characteristics, each of said PNPN diode crosspoints being a bistable circuit arrangement which is included in at least one of said paths.

References Cited by the Examiner

UNITED STATES PATENTS

| | | | |
|---|---|---|---|
| 2,684,405 | 7/54 | Bruce et al. | 179—18 |
| 2,779,822 | 1/57 | Ketchledge | 179—18 |
| 2,843,674 | 7/58 | Ketchledge | 179—18 |
| 2,853,631 | 9/58 | Wallace | 179—18 |
| 2,855,524 | 10/58 | Shockley | 179—18 |
| 2,883,467 | 4/59 | Ketchledge | 179—18 |
| 2,936,402 | 5/60 | Ketchledge | 179—18 |
| 2,951,124 | 8/60 | Hussey et al. | 179—18 |
| 2,951,125 | 8/60 | Andrews | 179—18 |

References Cited by the Applicant

UNITED STATES PATENTS

| | | |
|---|---|---|
| 2,876,285 | 3/59 | Bjornson et al. |
| 2,946,855 | 7/60 | Hussey. |
| 2,981,849 | 4/61 | Gobat. |
| 3,027,427 | 3/62 | Woodin. |
| 3,034,106 | 5/62 | Grinich. |

ROBERT H. ROSE, *Primary Examiner.*